(12) United States Patent
Astorg et al.

(10) Patent No.: US 11,738,658 B2
(45) Date of Patent: Aug. 29, 2023

(54) METHOD FOR CHARGING AN ACCUMULATOR BATTERY THROUGH A CHARGING TERMINAL

(71) Applicant: Nissan Motor Co., Ltd., Yokohama (JP)

(72) Inventors: Marine Astorg, Paris (FR); Thomas Dreumont, Miontigny le Bretonneux (FR); Thibaud Rolland, Meudon (FR)

(73) Assignee: Nissan Motor Co., Ltd., Yokohama (JP)

( * ) Notice: Subject to any disclaimer, the term of this patent is extended or adjusted under 35 U.S.C. 154(b) by 377 days.

(21) Appl. No.: 17/287,150

(22) PCT Filed: Oct. 18, 2019

(86) PCT No.: PCT/EP2019/078317
§ 371 (c)(1),
(2) Date: Apr. 21, 2021

(87) PCT Pub. No.: WO2020/083756
PCT Pub. Date: Apr. 30, 2020

(65) Prior Publication Data
US 2021/0387541 A1    Dec. 16, 2021

(30) Foreign Application Priority Data
Oct. 26, 2018 (FR) ...................... 1859928

(51) Int. Cl.
*B60L 53/62* (2019.01)
*B60L 53/66* (2019.01)
(Continued)

(52) U.S. Cl.
CPC ............... *B60L 53/62* (2019.02); *B60L 53/64* (2019.02); *B60L 53/665* (2019.02);
(Continued)

(58) Field of Classification Search
CPC .......... B60L 53/62; B60L 53/64; B60L 53/66; B60L 53/665; B60L 54/66; H02J 7/00;
(Continued)

(56) References Cited

U.S. PATENT DOCUMENTS

2012/0326655 A1   12/2012   Nomura
2016/0047862 A1   2/2016   Shimizu et al.

FOREIGN PATENT DOCUMENTS

CN          103020445 A      4/2013

*Primary Examiner* — Robert L Deberadinis
(74) *Attorney, Agent, or Firm* — Global IP Counselors, LLP (57) ABSTRACT

A charging method is performed to charge an accumulator battery of a vehicle. The charging method includes receiving data relating to the evolution over time of the electric power available at the charging terminal and the cost of electricity, and selecting a time window in which the cost of electricity is at a minimum. The charging method further includes estimating a temperature that the accumulator battery will have at the time of the time window and a level of charge that the accumulator battery will have before the time window, determining the electric power that the charging terminal is able to transmit to the accumulator battery during the time window, deducing a new level of charge that the accumulator battery will have at the end of the time window, comparing the new level of charge with a target level of charge, and charging the accumulator battery accordingly.

10 Claims, 3 Drawing Sheets

(51) Int. Cl.
*H02J 7/00* (2006.01)
*B60L 53/64* (2019.01)
*G06Q 30/0283* (2023.01)
*G06Q 50/06* (2012.01)

(52) U.S. Cl.
CPC ......... *G06Q 30/0283* (2013.01); *G06Q 50/06* (2013.01); *H02J 7/0048* (2020.01); *H02J 7/0071* (2020.01); *H02J 7/00712* (2020.01); *H02J 7/007194* (2020.01); *H02J 2203/20* (2020.01); *H02J 2310/48* (2020.01); *H02J 2310/64* (2020.01)

(58) Field of Classification Search
CPC ...... H02J 7/007; H02J 7/0048; H02J 7/00712; H02J 7/0071; H02J 2310/64; H02J 2203/20; H02J 2310/48; G06Q 30/0283; G06Q 50/06
See application file for complete search history.

METHOD FOR CHARGING AN ACCUMULATOR BATTERY THROUGH A CHARGING TERMINAL

CROSS-REFERENCE TO RELATED APPLICATIONS

This application is a U.S. national stage application of International Application No. PCT/EP2019/078317, filed on Oct. 18, 2019.

BACKGROUND

Technical Field

The present invention relates generally to charging accumulator batteries of electric vehicles. The invention more specifically relates to a method for charging, by means of a charging station, an accumulator battery with which a motor vehicle is fitted. It also relates to a motor vehicle designed to implement this charging method. It applies more particularly to electric cars.

Background Information

An electric car normally includes a high-capacity accumulator battery, which allows current to be supplied to electric motors provided for propelling the vehicle.

An accumulator battery of this kind has to be charged regularly. One solution for this consists in electrically connecting the car to a public charging station.

The ISO 15118 standard has thus been developed to define a standard communication protocol between a charging station and any car capable of being connected thereto.

In order for energy management to be optimized in the electricity grid, the vehicle must thus use the possibilities offered by this standard in a manner that complies with three major constraints. The first constraint consists in ensuring that the user's battery is sufficiently charged at the time when they wish to leave. The second constraint consists in not overestimating the user's needs so as not to needlessly monopolize the power available at the charging station. The third constraint consists in imposing, after the connection of the car to the charging station, a rather short timeframe on the car at the end of which it has to communicate to the charging station when, and the electrical power with which, the latter must charge the accumulator battery of the car.

The protocol used provides for the charging station transmitting, on connection of the motor vehicle, information regarding the change over time in the electrical power available at the charging station and in the price level for electricity (typically an off-peak time/peak time item of information).

A known method for selecting time slots during which the charging station has to charge the battery thus consists in selecting the nearest off-peak time slots.

This method unfortunately does not make it possible to ensure that the user's vehicle is ready to leave at the desired time.

One solution for overcoming this drawback might be to ask the user at what time they would like to leave and to select time slots such that the charging cost is as low as possible and the vehicle is sufficiently charged at the departure time.

This solution would however require the vehicle to be able to predict the progression of the state of charge of the battery on the basis of the selected time slots and of the electrical power available during each of these time slots.

For this purpose, a method for computing the progression of the state of charge of a battery is known from the document CN103020445, but this method requires the use of a computer with high computing power so as to be able to determine, during the time allotted by the ISO 15118 standard, which time slots to secure and the electrical power to reserve. This solution is thus very costly to implement.

SUMMARY

In order to overcome the aforementioned drawback of the prior art, the present invention proposes a simpler method for computing the change in the charging power as a function of time.

More particularly, a charging method for charging an accumulator battery of a vehicle is proposed that comprises:

receiving data relating to a change over time in an available electrical power at a charging station and a cost of electricity;

selecting a first time slot for which the available electrical power is non-zero and for which the cost of the electricity is at a minimum;

estimating a temperature of the accumulator battery a time of the first time slot and a state of charge of the accumulator battery at a start of the first time slot;

determining an electrical power that the charging station will be able to transmit to the accumulator battery during the first time slot based on the temperature and the state of charge that were estimated at the start of the first time slot;

deriving a new state of charge of the accumulator battery at an end of the first time slot based on the electrical power that was determined to transmitted to the accumulator battery during the first time slot;

comparing the new state of charge with a target state of charge; and charging the accumulator battery using the electrical power of the charging station during the first time slot if the new state of charge is higher than or equal to the target state of charge.

Thus the invention proposes a method that is simple to implement, requires little computing power and makes it possible to evaluate, with the required accuracy, which time slots should be reserved with the charging station in order to ensure that charging is as cheap as possible given the scheduled departure time of the vehicle and the electric power available from the charging station.

The invention also relates to a motor vehicle including at least one electric drive motor, an accumulator battery, which is designed to supply electric current to each electric motor, and a computer, which is programmed to implement a charging method as described above.

BRIEF DESCRIPTION OF THE DRAWINGS

The following description with reference to the appended drawings, which are provided by way of non-limiting examples, will provide a good understanding of the content of the invention and how it can be implemented.

In the appended drawings.

DETAILED DESCRIPTION OF EMBODIMENTS

An embodiment for implementing the charging method according to the present disclosure will be described below based on an embodiment illustrated in the drawings.

Figure 1:
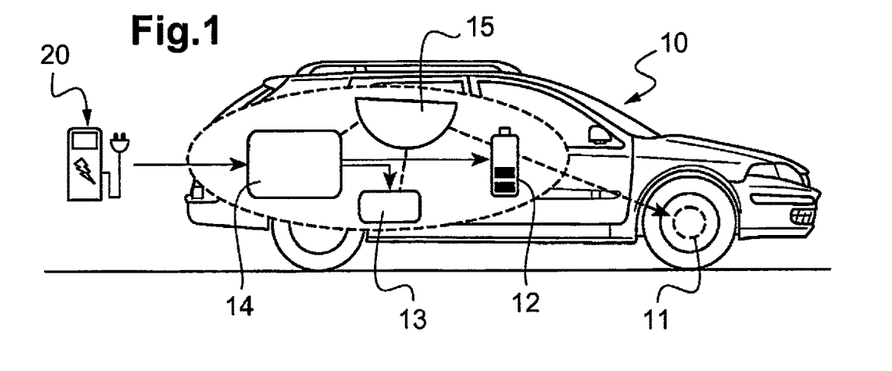
FIG. 1 is a schematic view of a charging station and a motor vehicle in accordance with the invention.

FIG. 1 shows an electric motor vehicle. In the present case, it is a car, but it could be another type of motor vehicle (motorcycle, truck, boat, etc.) This car is described here as being electric in the sense that it does not include an internal combustion engine. As a variant, it could be a plug-in hybrid vehicle. The electric car 10 conventionally includes a chassis and wheels. More specifically, in the present case, it includes:

- at least one electric motor 11, which allows the electric car 10 to be set into motion,
- an accumulator battery (referred to hereinafter as a traction battery 12), which is connected to each electric motor 11 to supply current thereto,
- auxiliary devices 13, which consume electrical current (air conditioning, multimedia console, etc.),
- a charger 14, and
- a computer 15.

The charger 14 includes a power socket to which a power plug of a charging station 20 can be connected. It is connected to the traction battery 12 in order to charge the latter. It is also connected in the present case to the auxiliary devices 13 so as to be able to supply them with current when the electric car 10 is connected to the charging station 20.

The computer 15, in turn, includes a processor (CPU), a memory and various input and output interfaces. The computer, by virtue of the input and output interfaces thereof, is designed to receive input signals from sensors or other devices. It is in particular designed to receive the instantaneous state of charge $SOC_0$ of the traction battery 12.

It is also designed to communicate with the charging station 20 via the charger 14 in order to receive data relating to the change over time in the electrical power $P_{20}$ available at the charging station 20 and in the cost $C_{20}$ of electricity.

The computer is also designed to communicate with this same charging station 20 to reserve time slots for charging the vehicle, by selecting an electrical charging power.

By virtue of the memory thereof, the computer 15 stores data used during the method described below. In particular, it stores a computing application that consists of computer programs comprising instructions whose execution by the processor allows the computer 15 to implement the charging method illustrated in FIG. 7 and described below.

Figure 7:
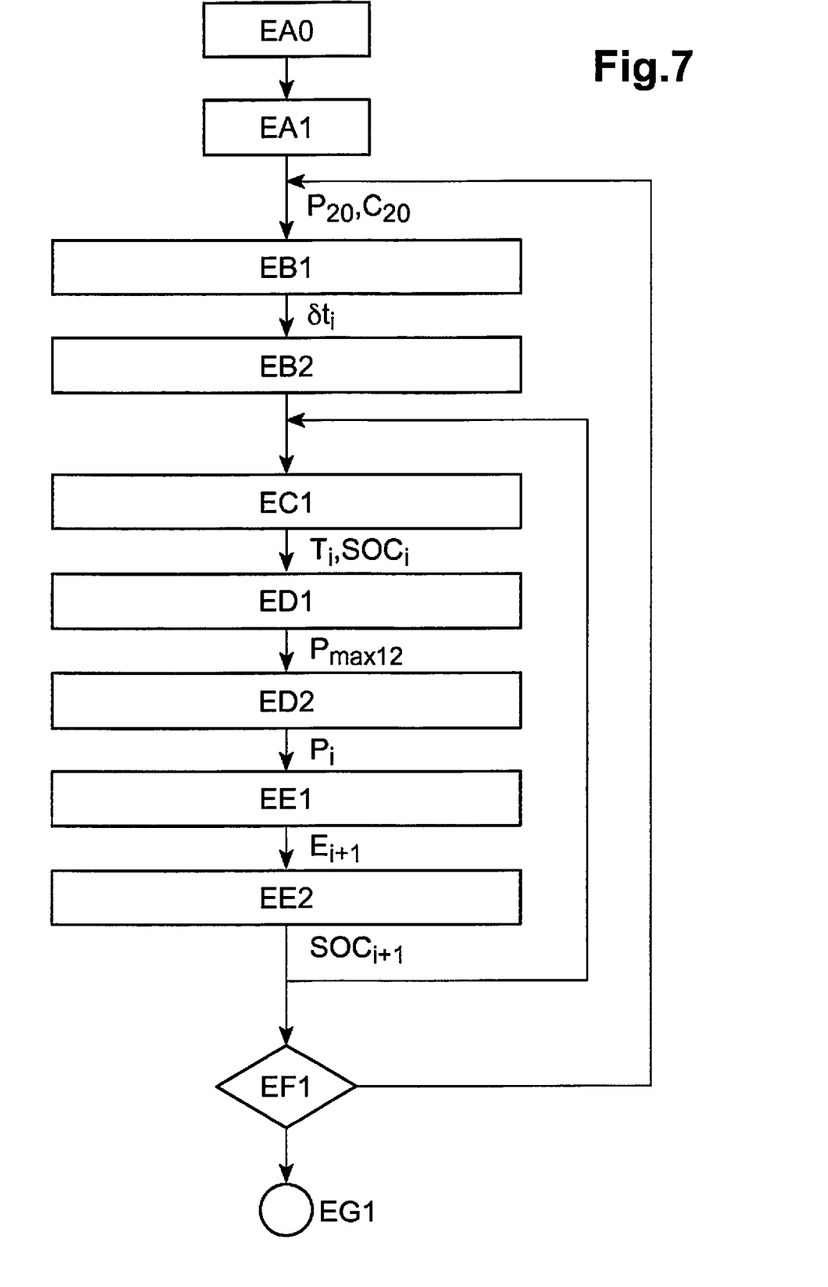
FIG. 7 is a flowchart illustrating a charging method in accordance with the invention.

As shown in this FIG. 7, this charging method includes eleven main steps that can be repeated in a loop. This method is specifically designed to allow the traction battery 12 to be charged by the charging station 20 in time slots that ensure that the traction battery 12 of the user's electric vehicle 10 will be sufficiently charged when the user needs it and that allow the cost of this charging operation to be minimized. This method is automatically initiated when the electric car 10 is connected to the charging station 20.

The first step EA0 of this method consists in checking that the traction battery 12 is not excessively discharged, which could result in this battery wearing out prematurely.

For this purpose, during this first step EA0, the computer 15 records the instantaneous state of charge $SOC_0$ of the traction battery 12. In the present case, this instantaneous state of charge $SOC_0$ is transmitted to the computer 15 by a third-party processor which is in charge of computing this state of charge. As a variant, it could be computed by the computer 15 on the basis of the voltage across the terminals of the traction battery 12.

The computer 15 then compares this instantaneous state of charge $SOC_0$ with a predetermined state-of-charge threshold $SOC_{min}$ which is fixed and is recorded in the read-only memory of the computer. This state-of-charge threshold $SOC_{min}$ is preferably between 10% and 30%. In the present case, it is equal to 20%.

If the instantaneous state of charge $SOC_0$ is higher than or equal to the state-of-charge threshold $SOC_{min}$, which means that there is no risk of the traction battery 12 wearing out prematurely, the method continues with a step EA1, which is described below.

Otherwise, the computer 15 sends a request to the charging station 20 to charge the traction battery 12 in the first available time slots until the instantaneous state of charge $SOC_0$ reaches the state-of-charge threshold $SOC_{min}$. Once this threshold has been reached, the method continues with step EA1.

During the second step EA1, the computer 15 acquires the departure time of the electric vehicle 10, i.e. the time at which the latter should be disconnected from the charging station 20.

In the present case, the computer 15 acquires not only this departure time but also the target state of charge $SOC_N$ that the traction battery 12 must have reached by that time.

For this purpose, the computer 15 may, for example, ask the user, via a dedicated human-machine interface, at what time they wish to leave and what the desired destination point is.

Taking the desired destination point into account, the computer 15 will be able to determine the target state of charge $SOC_N$ that the traction battery 12 must have reached in order to allow the user to reach this destination point.

As a variant, the computer 15 may automatically determine the time at which the vehicle will leave and the destination point, for example by detecting that the user always uses their electric car 10 to travel to work every weekday.

During the step EA1, the computer 15 furthermore receives, from the charging station 20, data relating to the change over time in the electrical power $P_{20}$ available at the charging station 20 and in the cost $C_{20}$ of electricity.

Figure 3A:
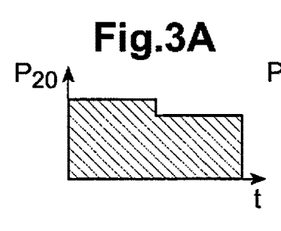
FIG. 3A is a graph illustrating an example of the change over time in the cost of electricity available at the charging station.

For example, it receives a table illustrating the change over time in the electrical power $P_{20}$ available at the charging station 20. Such a table is illustrated graphically in FIG. 3A.

Figure 2A:
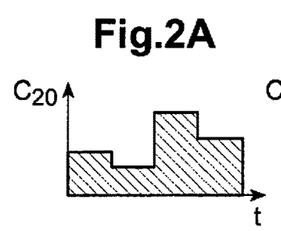
FIG. 2A is a graph illustrating an example of the change over time in the electrical power available at the charging station.

It also receives a table illustrating the change over time in the price level for electricity available from the charging station 20. Such a table is illustrated graphically in FIG. 2A. It can be observed in the present case that the price level changes between four different values. It goes without saying that the number of price levels may vary from one electricity supplier to the next.

In the present case, the tables received by the computer 15 show these changes over 24 hours. As a variant, they could show these changes over a different period (for example up to the departure time of the vehicle).

Once received by the computer 15, these tables are discretized here in 15-minute steps. For this purpose, the highest value of the cost $C_{20}$ of electricity within each 15-minute step is used as the sole value of the cost $C_{20}$ of electricity during this 15-minute step. The lowest value of the electrical power $P_{20}$ available within each 15-minute step is moreover used as the sole value of electrical power $P_{20}$ available during this 15-minute step.

Then, if the departure time is more than 24 hours away, the method continues with a step EB1 described below. Otherwise, the tables are redefined to avoid time slots after this departure time being able to be selected for charging the electric car 10.

Figure 2B:
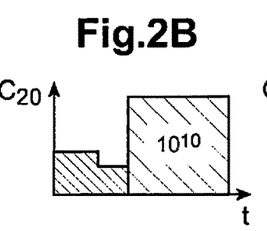
FIGS. 2B and 2C are graphs which correspond to that shown in FIG. 2A and illustrate how a time slot is selected with the charging station.
Figure 3B:
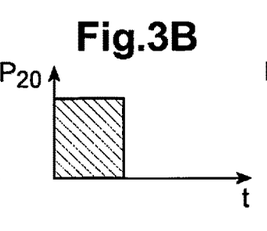
FIGS. 3B and 3C are graphs which correspond to that shown in FIG. 3A and illustrate how a time slot is selected with the charging station.

For this purpose, the cost $C_{20}$ of electricity for each time slot after the departure time is fixed at a very high value, for example $10^{10}$ euros (see FIG. 2B). In addition or as a variant, the electrical power $P_{20}$ available from the charging station 20 for each time slot after the departure time is fixed at a zero value (see FIG. 3B).

As a variant, the tables could have been redefined, with a safety margin of one hour, for example, being taken into account so as to ensure that the vehicle is charged one hour before the scheduled departure time.

Once the tables have been redefined, the method continues with step EB1.

This third step EB1 consists in selecting the nearest time slot $\delta t_i$ in which it will be advisable to charge the traction battery 12.

For this purpose, the computer 15 selects the nearest time slot $\delta t_i$ for which the electrical power $P_{20}$ available is non-zero and for which the cost $C_{20}$ of electricity is at a minimum.

During a fourth step EB2, the computer 15 then updates the tables so as to avoid this same time slot $\delta t_i$ subsequently being reselected.

Figure 2C:
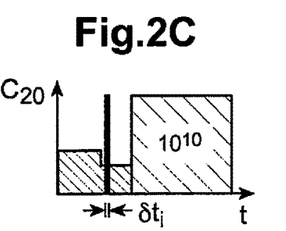
Figure 3C:
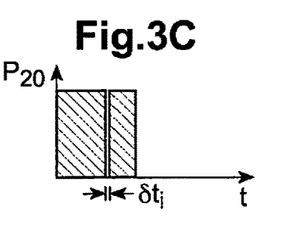
Figure 4A:
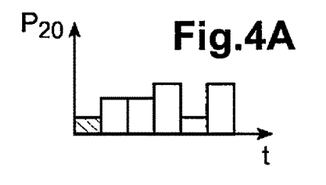
FIGS. 4A to 4D are graphs illustrating the successive reservation of four time slots with the charging station.
Figure 4B:
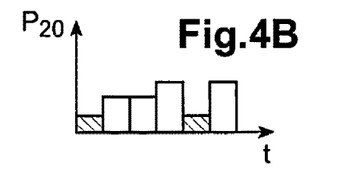
Figure 4C:
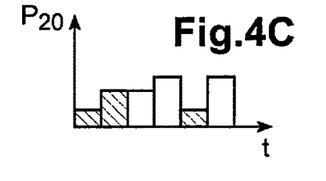
Figure 4D:
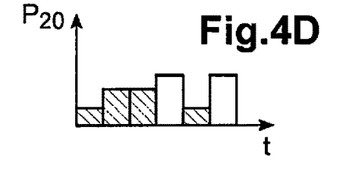

For this purpose, the cost $C_{20}$ of electricity during this time slot $\delta t_i$ is fixed at a very high value, for example $10^{10}$ euros (see FIG. 2C). In addition or as a variant, the electrical power $P_{20}$ available from the charging station 20 during this time slot $\delta t_i$ is fixed at a zero value (see FIG. 3C).

The following steps will then consist in estimating the state of charge $SOC_{i+1}$ that the traction battery 12 should exhibit at the end of the selected time slot $\delta t_i$ so as to check whether, by charging the traction battery 12 only during this time slot $\delta t_i$, the user will be able to reach the desired destination point.

For this purpose, during a fifth step EC1, the computer 15 estimates the temperature $T_i$ that the traction battery 12 will exhibit at the time of the selected time slot $\delta t_i$ (the time considered may be the start of the time slot or else any other time during this slot, such as the middle of the time slot).

This temperature $T_i$ may be estimated on the basis of a predetermined mathematical model or a predetermined map produced on a test bench.

In the present case, the computer 15 computes the temperature $T_i$ using the following mathematical model:

$$MCp \frac{dT_i}{dt} = RI^2 + \frac{\text{Text} - T_i}{Rthext} + \frac{Tair - T_i}{Rth(Qm)}$$

where:
MCp, R, Rthext and Rth(Qm) are thermal constants dependent on the chemistry of the traction battery 12,
Text is the ambient temperature,
Tair is the temperature of the system for heating/cooling the traction battery 12, if said system is activated, and
I is the current intensity of the traction battery 12.

The computer 15 then estimates the state of charge $SOC_i$ that the traction battery 12 will exhibit at the start of the time slot $\delta t_i$.

It will be considered in the present case that this state of charge $SOC_i$ will be equal to the instantaneous state of charge $SOC_0$. As a variant, it could be different if the traction battery 12 were intended to be used to supply power to the auxiliary devices 13 which consume electric current.

During a sixth step ED 1, the computer 15 computes the electrical power $P_{max12}$ permissible by the traction battery 12 during the time slot $\delta t_i$.

This permissible electrical power $P_{max12}$ is determined on the basis of the temperature $T_i$ and the state of charge $SOC_i$ that were estimated previously.

Figure 5:
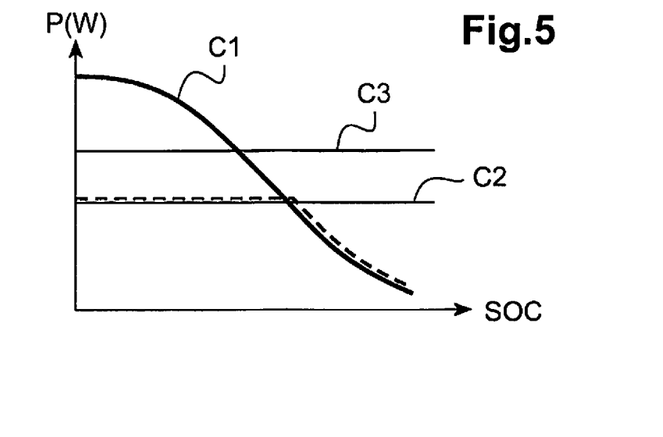
FIG. 5 is a graph illustrating the change in the maximum power that the accumulator battery of the vehicle shown in FIG. 1 is able to receive as a function of the state of charge thereof, this graph also illustrating the maximum power that the charging station is able to deliver and the maximum power that the charger of the motor vehicle is able to receive.

As shown by the curve C1 in FIG. 5, this power does in fact vary as a function of the state of charge SOC of the traction battery 12, and is lower the higher the state of charge SOC.

The permissible electrical power $P_{max12}$ also varies as a function of the temperature of the traction battery 12, this power being lower the higher the temperature T.

In order to determine the permissible electrical power $P_{max12}$, the computer 15 stores, in the memory thereof, tables of values that allow the permissible electrical power $P_{max12}$ to be determined on the basis of the temperature $T_i$ and the state of charge $SOC_i$ that were estimated previously.

During a seventh step ED2, the computer 15 reads from the memory thereof the maximum electrical power $P_{max14}$ permissible by the charger 14, which is a predetermined constant represented by the straight line C2 in FIG. 5.

It also reads the electrical power $P_{20}$ available at the charging station 20 in the selected time slot $\delta t_i$, which is represented by the straight line C3 in FIG. 5.

It then selects, from among the three powers $P_{max12}$, $P_{max14}$, $P_{20}$, the one which is lowest and therefore constitutes the factor that limits the power at which the traction battery 12 will be able to be charged.

As shown in FIG. 5, this limiting factor will differ depending on the state of charge SOC of the traction battery 12 (and depending on the temperature of the battery).

The selected electrical power $P_i$ is then associated with the time slot $\delta t_i$ as the power that will be required from the charging station 20 for charging the traction battery 12 (and possibly also for supplying power to the auxiliary devices 13).

The computer 15 then determines the new state of charge $SOC_{i+1}$ that the accumulator battery 12 will exhibit at the end of the time slot $\delta t_i$.

The value of this state of charge $SOC_{i+1}$ is derived from the electrical power $P_i$ that will be delivered by the charging station 20 during the time slot $\delta t_i$. It is also derived from the electrical power consumed by the auxiliary devices 13 (which power will be considered to be zero hereinafter for the sake of simplicity).

More precisely, in the present case, during an eighth step EE1, the computer 15 starts by determining the electrical energy $E_i$ stored in the traction battery 12 before the selected time slot $\delta t_i$.

The value of the electrical energy E1 will be derived in the present case from the instantaneous state of charge $SOC_0$ by means of the following mathematical formula:

$$E_i = SOC_0 \cdot E_{max} \cdot SOH/100$$

where:
- $E_{max}$ is a predetermined constant, which is recorded in the memory of the computer 15 and corresponds to the maximum electrical energy that the traction battery 12 can store, and
- SOH is the state of health of the traction battery 12, which is transmitted to the computer 15 by a third-party computer.

Then, the computer 15 determines the electrical energy $E_{i+1}$ that will be stored in the traction battery 12 at the end of the selected time slot $\delta t_i$ by means of the following mathematical formula:

$$E_{i+1} = E_i + P_i \cdot \Delta t,$$

with $\Delta t$ being equal to 15 minutes in the present case.

During a ninth step EE2, the computer 15 derives therefrom the new state of charge $SOC_{i+1}$ that the traction battery 12 will exhibit at the end of the selected time slot $\delta t_i$ by means of the following mathematical formula:

$$SOC_{i+1} = 100 \cdot E_{i+1} / (E_{max} \cdot SOH)$$

During a tenth step EF1, the computer 15 compares this new state of charge $SOC_{i+1}$ with the target state of charge $SOC_N$.

If the new state of charge $SOC_{i+1}$ is higher than or equal to the target state of charge $SOC_N$, the method continues with an eleventh step EG1 during which the computer 15 sends the charging station a request reserving an electrical power $P_i$ during the selected time slot $\delta t_i$.

Otherwise, i.e. if this time slot $\delta t_i$ alone will not allow the target state of charge $SOC_N$ to be reached, the method is repeated from the third step EB1 so as to check whether it is possible to sufficiently charge the traction battery 12 by selecting not just a single time slot, but two time slots.

As shown in FIGS. 4A to 4D, the method may be repeated as many times as necessary, with as many additional time slots being selected as will be needed to reach the target state of charge $SOC_N$.

The manner in which the method is repeated can thus be described briefly.

When it repeats the third step EB1 for a first time, the computer 15 selects the nearest time slot $\delta t_j$ for which the available electrical power $P_{20}$ is non-zero and for which the cost $C_{20}$ of electricity is at a minimum. Since the tables have been updated, the time slot $\delta t_i$ will not be reselected here.

Then, during the fourth step EB2, the computer 15 updates the tables so as to avoid this new time slot $\delta t_j$ subsequently being reselected.

The following steps will then consist in estimating the state of charge that the traction battery 12 should exhibit at the end of the two selected time slots $\delta t_i$, $\delta t_j$.

For this purpose, the computer first considers that one of the two selected time slots $\delta t_i$, $\delta t_j$ that is nearest to the present instant.

Let it be considered, for example, that this is the time slot $\delta t_j$ (such that it is possible to state j<i).

Then, during the fifth step EC1, the computer 15 estimates the temperature $T_j$ that the traction battery 12 will exhibit at the time of the time slot $\delta t_j$ using the aforementioned mathematical model.

The computer 15 also estimates the state of charge $SOC_i$ that the traction battery 12 will exhibit at the start of the time slot $\delta t_d$. This state of charge $SOC_i$ will be considered in the present case to be equal to the instantaneous state of charge $SOC_0$.

During the sixth step ED1, the computer 15 computes the electrical power $P_{max12}$ permissible by the traction battery 12 during this time slot $\delta t_j$ in the same way as has been explained previously.

During the seventh step ED2, the computer 15 derives therefrom the electrical power $P_i$ at which it will be possible to charge the traction battery 12 during this time slot $\delta t_j$.

During the eighth and ninth steps EE1, EE2, the computer 15 determines the new state of charge $SOC_{j+1}$ that the accumulator battery 12 will exhibit at the end of the time slot $\delta t_j$.

Then, the computer repeats steps EC1 to EE2 with regard, this time, to the other time slot $\delta t_i$.

For this purpose, during the fifth step EC1, the computer 15 estimates the temperature $T_i$ that the traction battery 12 will exhibit at the time of the time slot $\delta t_i$ using the aforementioned mathematical model.

Then, the computer 15 will estimate the state of charge $SOC_i$ that the traction battery 12 will exhibit at the start of the time slot $\delta t_i$. This state of charge $SOC_i$ will be considered in the present case to be equal to the state of charge $SOC_{j+1}$.

During the sixth step ED1, the computer 15 computes the electrical power $P_{max12}$ permissible by the traction battery 12 during this time slot $\delta t_i$ in the same way as has been explained previously.

During the seventh step ED2, the computer 15 derives therefrom the electrical power $P_i$ at which it will be possible to charge the traction battery 12 during this time slot $\delta t_i$.

During the eighth and ninth steps EE1, EE2, the computer 15 determines the new state of charge $SOC_{i+1}$ that the accumulator battery 12 will exhibit at the end of the time slot $\delta t_i$.

Finally, during the tenth step EF1, the computer 15 compares this new state of charge $SOC_{i+1}$ with the target state of charge $SOC_N$.

If the new state of charge $SOC_{i+1}$ is higher than or equal to the target state of charge $SOC_N$, the computer 15 sends the charging station a request to reserve the electrical power $P_1$, $P_j$ selected at the time of the two selected time slots $\delta t_i$, $\delta t_j$.

Otherwise, the method is repeated again from the third step EB1, with three time slots (including the two time slots $\delta t_i$, $\delta t_j$) being selected this time.

Figure 6A:
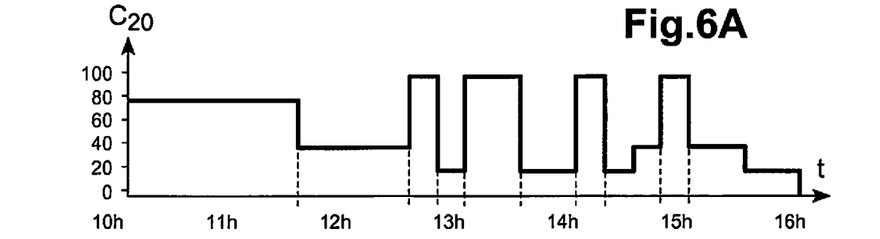
FIGS. 6A, 6B and 6C are graphs illustrating the change over time of the cost of electricity available from the charging station, the state of charge of the accumulator battery of the motor vehicle, and the electrical power consumed from the charging station, respectively.

FIG. 6A shows an example of the change over time in the cost $C_{20}$ of electricity available from the charging station 20.

Figure 6B:
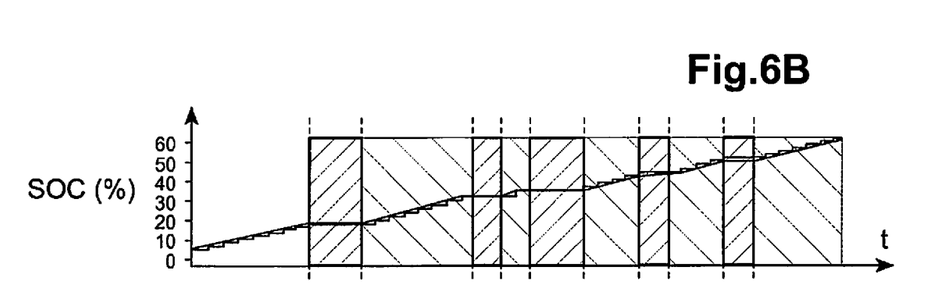

FIG. 6B shows (concomitantly) the predicted change in the state of charge SOC of the traction battery 12 up to the departure time.

Figure 6C:
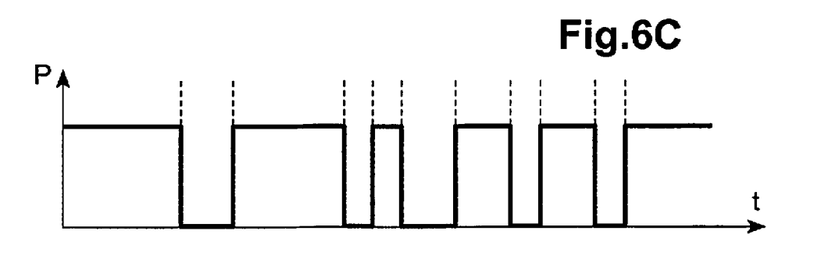

FIG. 6C shows (concomitantly) the variations over time in the electrical power P reserved in each time slot with the charging station 20.

It can be observed in FIG. 6B that at the outset of the method, provision is made for charging the traction battery 12 until the state of charge threshold above which there is no longer any risk of the traction battery 12 wearing out prematurely is reached.

Provision is then made for charging the battery during the time slots in which the cost of electricity is low. Finally, it can be observed that at the departure time provision is made for the state of charge of the traction battery 12 to have reached the target state of charge, which is 60% in the present case.

By virtue of the described method, the computer 15 is thus able to quickly send the charging station 20 a request containing the reserved time slots and the electrical power required in each time slot.

This method is based on a simplified estimate of the change in the state of charge SOC of the traction battery 12, in order to reduce the computing power required to implement the method.

The estimate can thus be slightly erroneous.

In order to avoid any charging problems, once charging has begun, provision is preferably made for implementing an operation of monitoring the change in the state of charge SOC of the traction battery 12.

For this purpose, the computer records, at every instant, the instantaneous value of the state of charge SOC of the traction battery 12 and then compares this value with the expected value.

As long as the difference between these two values remains below a predetermined threshold, no correction is made.

However, if this difference exceeds the threshold, the computer reinitializes the method described above, in particular by sending a request to the charging station to find out the new tables for the cost of electricity and the power available from the station.

During the implementation of the method, a correction coefficient is, however, applied in the present case to the computation of the electrical power $P_{max12}$ permissible by the traction battery 12.

The value of this correction coefficient is preferably adjusted as a function of the speed at which the instantaneous value of the state of charge has deviated from the expected value of the state of charge.

Once the method has been completed, the computer 15 sends a new request to the charging station 20 to reserve new time slots: this is known as "renegotiation".

The invention claimed is:

1. A charging method for charging an accumulator battery of a vehicle, the charging method comprising:
   receiving data relating to a change over time in an available electrical power at a charging station and a cost of electricity;
   selecting a first time slot for which the available electrical power is non-zero and for which the cost of the electricity is at a minimum;
   estimating a temperature of the accumulator battery a time of the first time slot and a state of charge of the accumulator battery at a start of the first time slot;
   determining an electrical power that the charging station will be able to transmit to the accumulator battery during the first time slot based on the temperature and the state of charge that were estimated at the start of the first time slot;
   deriving a new state of charge of the accumulator battery at an end of the first time slot based on the electrical power that was determined to transmitted to the accumulator battery during the first time slot;
   comparing the new state of charge with a target state of charge; and
   charging the accumulator battery using the electrical power of the charging station during the first time slot if the new state of charge is higher than or equal to the target state of charge.

2. The charging method as claimed in claim 1, further comprising
   selecting a second time slot upon determining the new state of charge is lower than the target state of charge;
   estimating the temperature of the accumulator battery at the second time slot and the state of charge of the accumulator battery at a start of the second time slot;
   determining the electrical power of the charging station to transmitted to the accumulator battery during the second time slot based on the temperature and the state of charge that were estimated at the start of the second time slot;
   deriving an additional new state of charge of the accumulator battery at an end of the second time slot based on the electrical power that was determined to transmitted to the accumulator battery during the second time slot; and
   comparing the target state of charge with the state of charge of the accumulator battery after the time slot and the second time slot.

3. The charging method as claimed in claim 1, further comprising
   acquiring a departure time at which the vehicle is scheduled to be disconnected from the charging station, and
   the selecting of the first time slot further including selecting the first time slot to be prior to the departure time.

4. The charging method as claimed in claim 2, further comprising
   determining the electrical power that the charging station will be able to transmit to the accumulator battery during each of the first and second time slots, and deriving a change in the state of charge of the accumulator battery up to the departure time based on a determination result of the electrical power that the charging station will be able to transmit to the accumulator battery during each of the first and second time slots.

5. The charging method as claimed in claim 1, wherein the selecting of the first time slot further including selecting an earliest time slot as the first time slot where the cost of the electricity is at the minimum in several time slots.

6. The charging method as claimed in claim 1, further comprising
   prior to the receiving the data relating to the change over time in the available electrical power at the charging station and the cost of the electricity,
   determining an instantaneous state of charge of the accumulator battery,
   comparing the instantaneous state of charge with a state-of-charge threshold, and
   charging the accumulator battery in a first time slot for which the available electrical power is non-zero if the instantaneous state of charge (SOC0) is lower than the state-of-charge threshold.

7. The charging method as claimed claim 1, wherein the estimating the temperature of the accumulator battery based a predetermined mathematical model or a predetermined map.

8. The charging method as claimed in claim 1, wherein the determining of the electrical power that the charging station will be able to transmit to the accumulator battery during the first time slot further includes selecting a lowest electrical power from among the electrical power available at the charging station in the first time slot that was selected, and determining a maximum permissible electrical power for the vehicle based on the temperature and the state of charge that were estimated.

9. The charging method as claimed in claim 1, wherein the deriving of the new state of charge of the accumulator battery at the end of the first time slot further includes computing an energy amount that will have been stored in the accumulator battery at the end of the first time slot and then deriving therefrom the new state of charge.

10. A vehicle comprising:
at least one electric drive motor; and
an accumulator battery electrically connected to the at least one electric drive motor to supply electric current to the at least one electric drive motor; and
a computer programmed to implement the charging method as claimed in claim 1.

* * * * *